(12) United States Patent
Brown

(10) Patent No.: US 8,960,125 B1
(45) Date of Patent: Feb. 24, 2015

(54) CONVERTIBLE WATER BOTTLE POUCH AND BOWL

(71) Applicant: Craig Brown, Newport Beach, CA (US)

(72) Inventor: Craig Brown, Newport Beach, CA (US)

( * ) Notice: Subject to any disclaimer, the term of this patent is extended or adjusted under 35 U.S.C. 154(b) by 47 days.

(21) Appl. No.: 13/931,811

(22) Filed: Jun. 28, 2013

Related U.S. Application Data

(60) Provisional application No. 61/665,883, filed on Jun. 28, 2012.

(51) Int. Cl.
*A01K 5/01* (2006.01)

(52) U.S. Cl.
USPC ............................................................ 119/72

(58) Field of Classification Search
USPC ......... 119/72, 61.56, 61.5; D30/129; 220/9.2, 220/574; 393/72, 74
See application file for complete search history.

(56) References Cited

U.S. PATENT DOCUMENTS

| | | | | |
|---|---|---|---|---|
| 216,227 | A * | 6/1879 | Sedgwick | 220/9.2 |
| 4,383,564 | A * | 5/1983 | Hoie | 383/66 |
| 5,810,194 | A * | 9/1998 | Samsel | 220/574 |
| 6,016,772 | A * | 1/2000 | Noyes | 119/863 |
| 6,019,244 | A * | 2/2000 | Jones | 220/666 |
| D438,348 | S * | 2/2001 | Grady et al. | D30/129 |
| 6,516,748 | B1 * | 2/2003 | Jackson | 119/72 |
| 6,783,016 | B2 * | 8/2004 | Wang | 220/9.2 |
| 7,967,510 | B2 * | 6/2011 | Martuch | 383/207 |
| 8,109,234 | B1 * | 2/2012 | LeCoq | 119/61.56 |
| 8,408,793 | B2 * | 4/2013 | Martuch | 383/207 |
| 8,438,993 | B2 * | 5/2013 | Nangia | 119/61.56 |
| 8,613,262 | B1 * | 12/2013 | Mergard | 119/858 |
| 2009/0199776 | A1 * | 8/2009 | Alexander et al. | 119/61.56 |
| 2010/0050949 | A1 * | 3/2010 | Hsieh | 119/61.56 |

* cited by examiner

*Primary Examiner* — Yvonne Abbott
(74) *Attorney, Agent, or Firm* — Kafantaris Law Offices; Theo Kafantaris

(57) ABSTRACT

The present invention will provide a water bottle holder which is convertible into a bowl-shaped water receptacle. Furthermore, the present invention will eliminate the need for an owner to carry a water bottle and a cumbersome water bowl when taking his or her dog for a walk. This is accomplished by utilizing a water bottle carrying sleeve which doubles as a water bowl.

19 Claims, 5 Drawing Sheets

CONVERTIBLE WATER BOTTLE POUCH AND BOWL

CROSS-REFERENCE TO RELATED APPLICATIONS

This application claims the benefit of U.S. Provisional Patent Application No. 61/665,883, filed on Jun. 28, 2012, and incorporated herein by reference.

STATEMENT REGARDING FEDERALLY SPONSORED RESEARCH AND DEVELOPMENT

Not Applicable.

FIELD OF THE INVENTION

This invention relates to a water bottle carrying device and more particularly, to a device where the water bottle holder converts to a water bowl.

DISCUSSION OF RELATED ART

Ownership of a companion dog is very common in today's society. While domesticated dogs can provide security and companionship to the owner, it is imperative that the animal is exercised on a regular basis to promote a healthy lifestyle. With dog ownership becoming increasingly popular, dog parks have become the best place for a dog to exercise and socialize with other animals.

The most common tool for walking a dog is a dog leash. A dog leash will provide the dog owner with the control required to bring a pet outside safely. Dog leashes are effective in preventing the animal from fleeing, attacking other animals or humans, controlling urination and defecation locations, establishing a control relationship with the animal, and various other tasks. Leashes also provide a clear method of communication between the owner and the animal during training. Typically, the owner will take the animal outside on a dog leash and, if permissible, allow the dog to roam off-leash.

At home, a responsible dog owner will provide fresh water daily for their animals. Typically, a water bowls is used as a receptacle for water. Unfortunately, water bowls are designed big and bulky to ensure longevity and are intended to remain stationary. As such, there is no way to provide water to an animal when away from home without sufficient foresight.

During a dog walk, it is crucial to provide the animal with adequate hydration. Even with a water fountain nearby, some dogs will not drink water unless provided in a bowl, as they are accustomed to. Many times, a dog walk is cut short to ensure the animal is adequately hydrated. Even with sufficient foresight to bring a water bottle, there is no convenient way to provide the water to the animal.

While collapsible dog bowls exist in the prior art, they are an external accessory often forgotten during a walk and only serve as a receptacle for water. Therefore, a need exists for an easy to use and robust device which allows a dog owner to hydrate their animal while on a walk, especially when there is no readily available water. The present invention satisfies these needs.

SUMMARY OF THE INVENTION

The present invention will provide a water bottle holder which is convertible into a bowl-shaped water receptacle. Furthermore, the present invention will eliminate the need for an owner to carry a water bottle and a cumbersome water bowl when taking his or her dog for a walk. This is accomplished by utilizing a water bottle carrying sleeve which doubles as a water bowl.

In the preferred embodiment, the present invention discloses a water resistant sleeve comprising a closed end or elastic end, a draw string end, and means for attaching the sleeve to a rope or leash. These components work in conjunction to provide a water bottle vessel which is convertible into a water holding article. The closed or elastic end and the tightened draw string end act similar to the ends of a hammock, allowing for the recessed portion of the sleeve to be formed and maintained when liquid is introduced. Alternatively, both ends of the sleeve can be elastic, eliminating the need for the user to tighten and secure the draw string. Lastly, the closed or elastic end can be replaced by a cup-shaped article and the sleeve designed in such a manner as to allow the sleeve to peel back around the article.

These and other objectives of the present invention will become obvious to those of ordinary skill in the art after reading the following detailed description of the preferred embodiments. It is to be understood that the foregoing general description and the following detailed description are exemplary, and are intended to provide further explanation of the invention as claimed.

DETAILED DESCRIPTION OF THE PREFERRED EMBODIMENT

Figure 1:
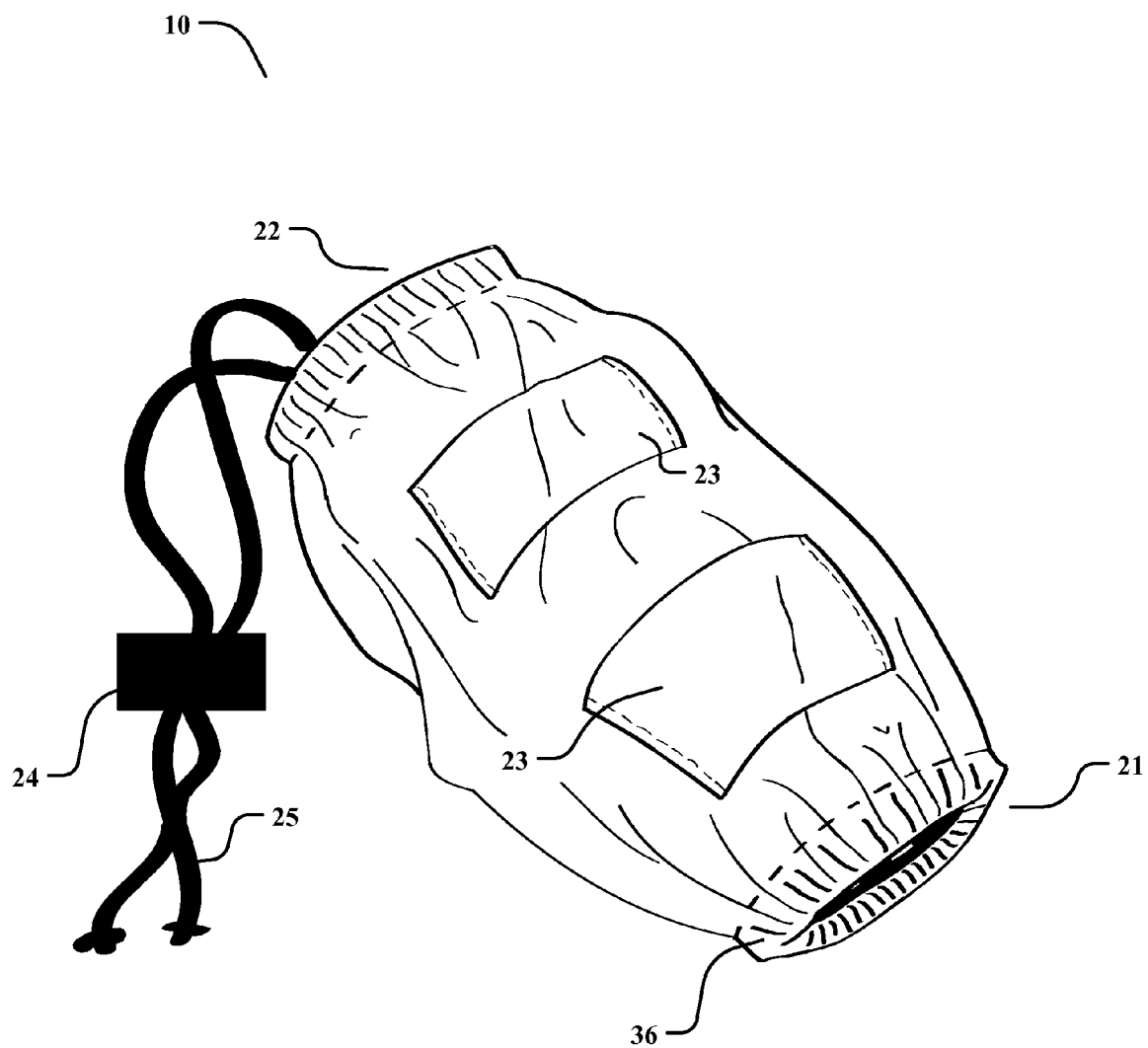
FIG. 1 is a rear perspective view of the present invention with water bottle inside.
Figure 2:
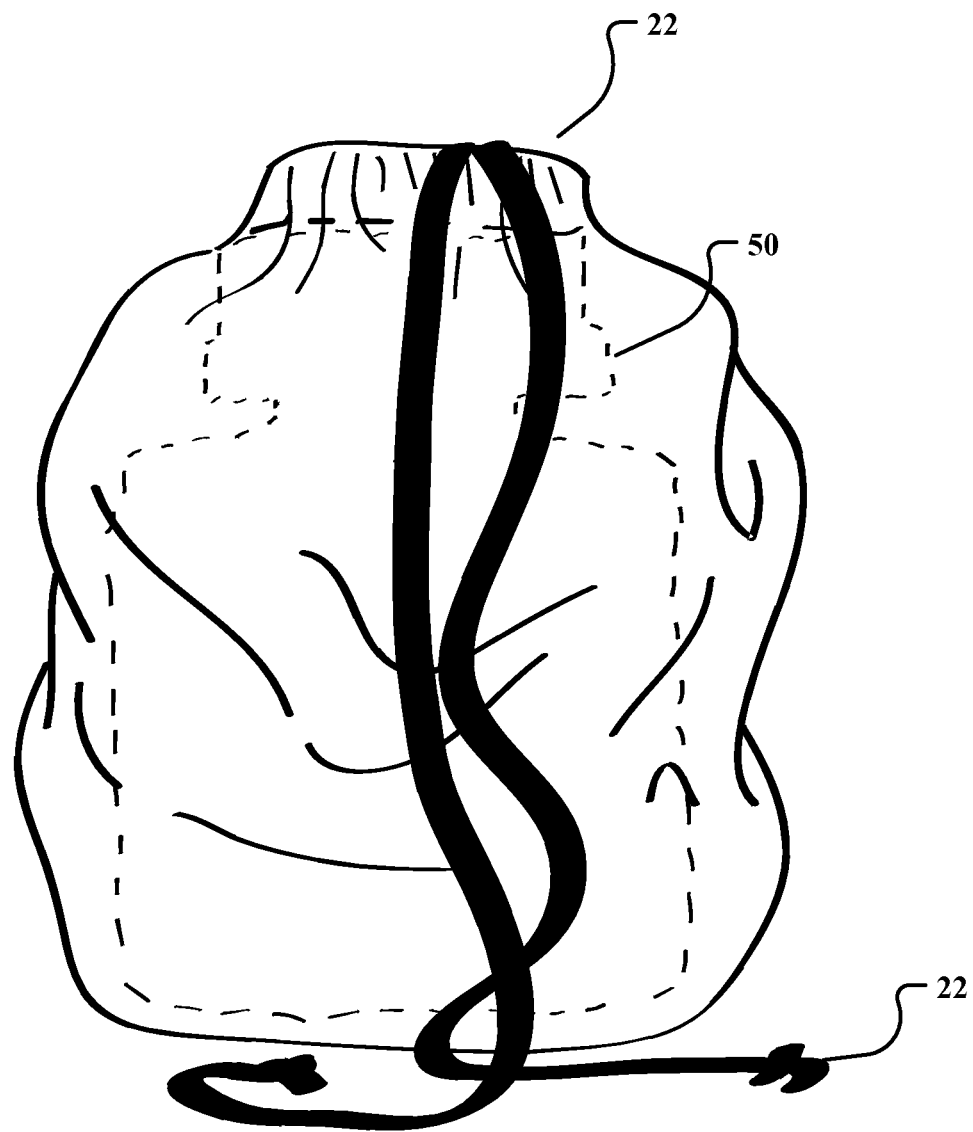
FIG. 2 is a front perspective view of the present invention with water bottle inside.
Figure 3:
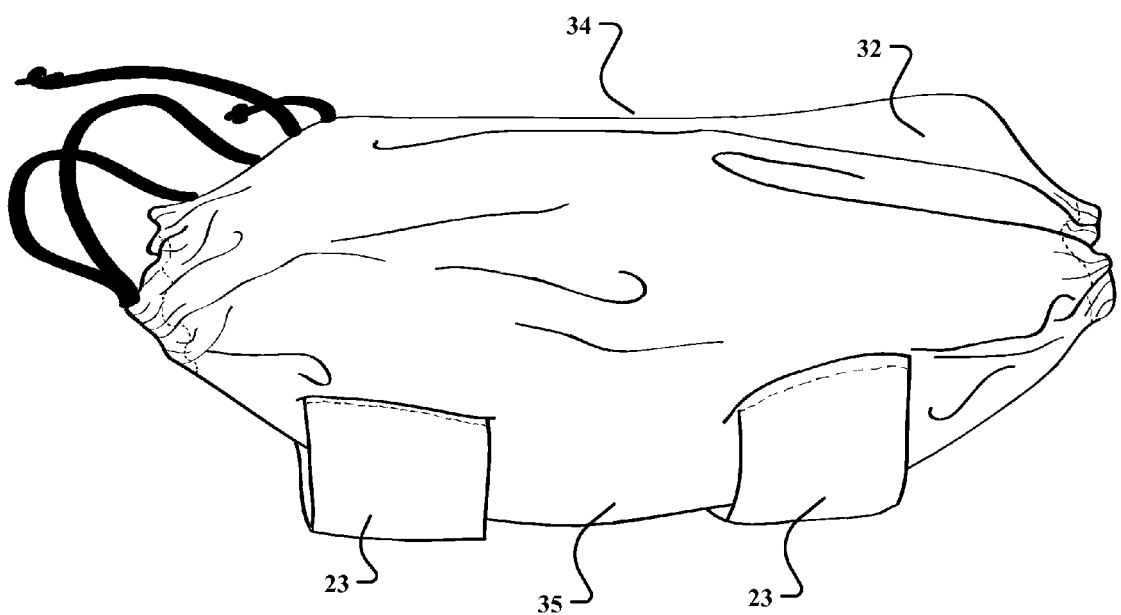
FIG. 3 is a side view of the present invention without water bottle inside.
Figure 4:
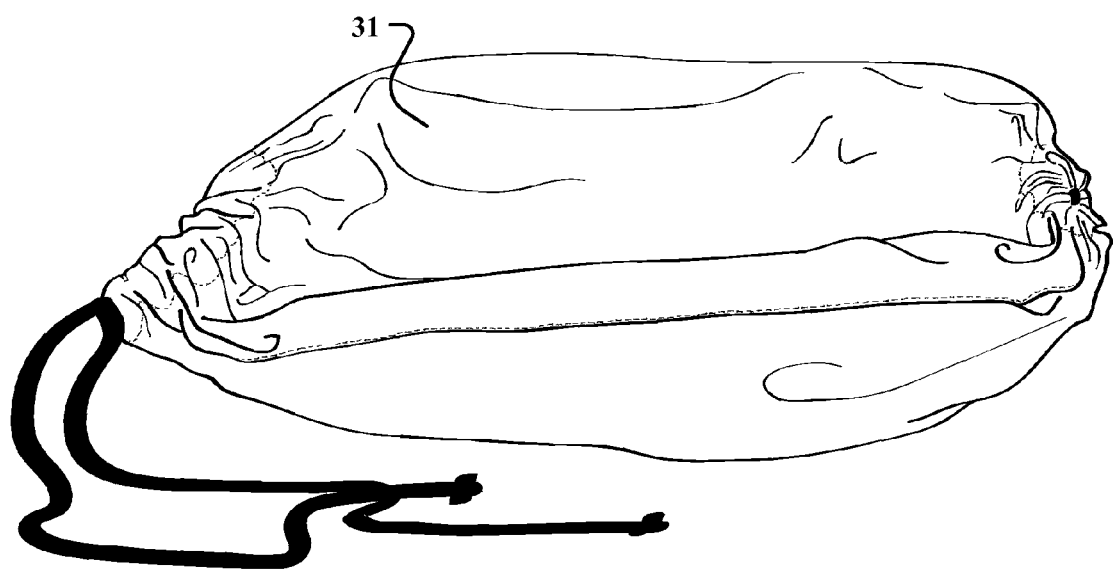
FIG. 4 is a side view of the present invention without water bottle inside in a bowl shape.
Figure 5:
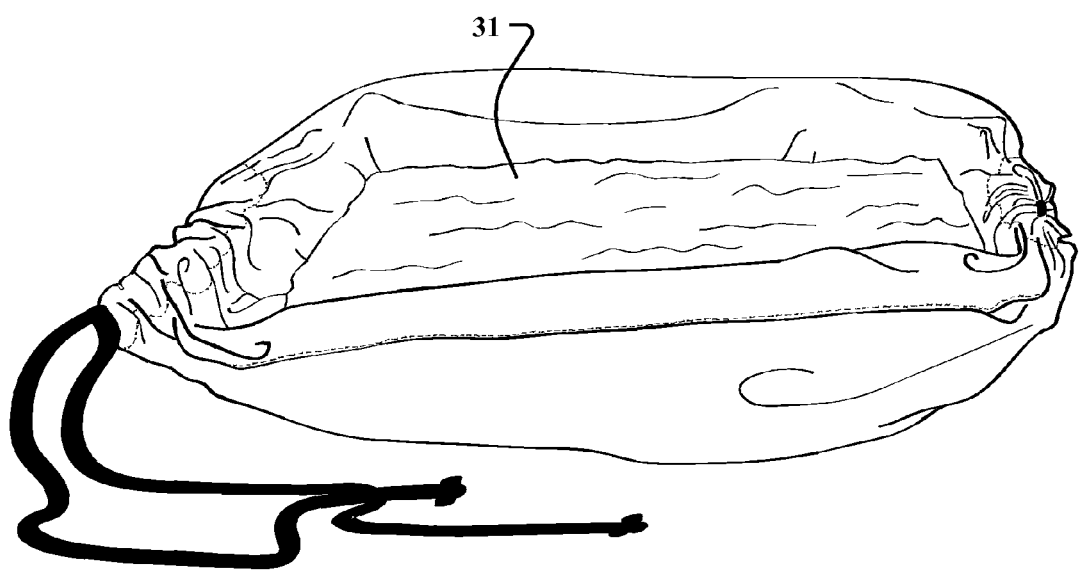
FIG. 5 is a side view of the present invention without water bottle inside in a bowl shape with water filled in the bowl.

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

The present invention discloses a water resistant sleeve 10 comprising a closed or elastic end 21, a draw string end 22, and a means 23 for attaching the sleeve to a rope or leash.

These components work in conjunction to provide a water bottle vessel which is convertible into a water holding article. When not in use, the water resistant sleeve 10 secures the water bottle between the tight, closed or elastic end 21 and the draw string end 22. When in use, the water bottle 50 is removed and the sleeve is converted into a bowl 31. This operates to eliminate the hassle of carrying a portable water bowl and a water bottle 50 while walking a dog on a leash.

When not in use, the present invention is secured to a leash as it is connected to a dog collar during a dog walk. In the preferred embodiment, the means 23 for attaching the sleeve is not adjustable, and the device will simply rests near the connection point of the leash and the dog's collar as it slides down the leash. This operates to shift the weight of the water bottle 50 from the owner to the dog, albeit comfortably for the animal. In the preferred embodiment, a plurality of attachment points are disposed on the outer surface of the sleeve and operate to limit rotational movement. Alternatively, the attachment points may be adjustable, permitting the owner to lock the device at any position on the leash.

When in use, the water bottle 50 will be removed and the water resistant sleeve 10 will be converted into a water bowl 31. Here, the tightness of the draw string end 22 is adjustable and can be loosened, allowing easy access to the water bottle. A sliding lock or cord stop 24 is used to secure the draw string 25 in the tightened position when not in use (water bottle is inside of the sleeve) and used to loosen the draw string 25 when in the open position (for removal of the water bottle 50).

Once the water bottle 50 is removed, the cord stop 24 permits the draw string end 22 to mimic the tight, elastic band end 21 of the sleeve, which provides important support necessary to create the recessed bowl-shape 31. To form the bowl 31, the owner will pull the cord stop 24 tight and depress the water resistant sleeve 10. With the attachment means 23 facing downward, the owner will position the fingers of their right and left hand on the exterior surface 32 of the water resistant sleeve 10 and presses the elastic end 21 and the tightened draw string end 22 in opposite directions, pulling them away from each other.

The owner will then manipulate the water resistant sleeve 10 such that the interior surface 33 of the top 34 is flush with the interior surface of the bottom 35. This creates a recessed, bowl-shape 31 in the water resistant sleeve 10. The water resistant sleeve 10 is made from a water-resistant and washable material to ensure that liquid will not pass through. As such, the owner can pour water for the dog into the bowl-shaped sleeve 31. Each device will have a different size for larger or smaller dogs. For a small dog, a smaller water bottle and water resistant sleeve 10 are used, while larger dogs require a larger water bottle and water resistant sleeve 10. After the dog is finished rehydrating, the user discards any remaining water, loosens the draw string end 22, inserts the water bottle 50 within the water resistant sleeve 10, secures it by tightening the draw string 25, and replaces it on the leash using the leash attachment means 23.

The closed or elastic end 21 and the draw string end 22 both act as a point of convergence for the portion of material on their respective ends. The closed or elastic end 21 is necessary to achieve the bowl-like shape 31 of the water resistant sleeve 10 once the water bottle is removed through use of an elastic cord 36 for keeping the end compressed. The closed or elastic end 21 and the tightened draw string end 22 act as the tips of a hammock, allowing for the recessed portion of the water resistant sleeve 10 to be formed and maintained when liquid is introduced. The closed or elastic end 21 essentially creates the tip of a rounded cone, with the loose draw string end 22 being the base. When the draw string end 22 is tightened, the base of that cone is converged to a single point. This essentially creates two half-spheres on opposite ends with a cylindrically shaped middle portion extending therebetween. The creation of the bowl-shape 31 is the equivalent of cutting though this shape longitudinally to form a trough.

In an alternative embodiment, both ends are elastic. In a further alternative embodiment, the tight, closed or elastic end 21 is replaced with a rigid, cup-shaped article. The bottom of the cup-shaped article is connected to the inside portion of the end of the water resistant sleeve 10. When the water bottle is removed, the water resistant sleeve 10 is peeled back, exposing the cup-shaped article. The cup-shaped article can then be filled with water for the dog to drink. In a further alternative embodiment, the means of attachment is a hook and loop type fastener. In yet a further alternative embodiment, the water resistant sleeve 10 will have pockets capable of retaining dog treats. In still a further alternative embodiment, the water resistant sleeve 10 may provide a logo and colors pertaining to a character, team logo, school logo, or other design.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A convertible water bottle pouch and bowl comprising:
  a water resistant sleeve having a generally cylindrical shape and further comprising a closed end and an opposing open end;
  an elastic cord attached to the perimeter of said closed end for compressing said closed end;
  a draw string attached to the perimeter of said open end for opening and closing said open end;
  a draw string locking means; and
  an attachment means;
  wherein said water resistant sleeve is adapted to contain a water bottle and further adapted to create a bowl-like shape for holding fluid.

2. The convertible water bottle pouch and bowl of claim 1, wherein said draw string locking means further comprises a cord stop.

3. The convertible water bottle pouch and bowl of claim 1, wherein said attachment means further comprises a plurality of loops attached to said water resistant sleeve, wherein a dog leash is placed through said loops for retaining said convertible water bottle pouch and bowl.

4. The convertible water bottle pouch and bowl of claim 1, wherein said attachment means further comprises a hook and loop type fastener attached to said water resistant sleeve.

5. The convertible water bottle pouch and bowl of claim 1, wherein said water resistant sleeve further comprises a plurality of pockets capable of retaining dog treats.

6. The convertible water bottle pouch and bowl of claim 1, wherein said water resistant sleeve further comprises a logo.

7. The convertible water bottle pouch and bowl of claim 1, wherein said water resistant sleeve further comprises a plurality of sizes for smaller and larger dogs.

8. The convertible water bottle pouch and bowl of claim 1, wherein said water resistant sleeve further comprises a cup-shaped article attached to the water-resistant sleeve for helping shape the bowl.

9. The convertible water bottle pouch and bowl of claim 1, wherein said water resistant sleeve further comprises a construction material adapted to resist water permeation.

10. A method for converting a water bottle pouch into a bowl, the method comprising:
- removing the water bottle pouch from a dog leash attached with an attachment means;
- releasing a draw string locking means;
- loosening a draw string attached to the perimeter of an open end of a water resistant sleeve having a generally cylindrical shape, said water resistant sleeve further comprising an opposing closed end with an attached elastic cord on the perimeter of said closed end for compressing said closed end;
- opening said open end;
- removing a water bottle contained within said water bottle pouch;
- tightening said draw string;
- securing said locking means to said draw string;
- forming a bowl-shape within said water resistant sleeve between said open and closed ends, said bowl-shape occurring easily and naturally due to the compression of both opposing open and closed ends of said water resistant sleeve, forming a bowl-shaped water resistant sleeve; and
- pouring water from said water bottle into said bowl-shaped water resistant sleeve;
- wherein an animal will drink said water from said bowl-shaped water resistant sleeve.

11. The method of claim 10, further comprising:
- discarding the remaining water from said bowl-shaped water resistant sleeve;
- releasing said draw string locking means;
- loosening said draw string;
- opening said open end;
- returning said water bottle;
- tightening said draw string;
- securing said locking means to said draw string; and
- returning said water bottle pouch to said leash.

12. The method of claim 11, wherein said draw string locking means further comprises a cord stop.

13. The method of claim 11, wherein said attachment means further comprises a plurality of loops attached to said water resistant sleeve, wherein a dog leash is placed through said loops for retaining said convertible water bottle pouch and bowl.

14. The method of claim 11, wherein said attachment means further comprises a hook and loop type fastener attached to said water resistant sleeve.

15. The method of claim 11, wherein said water resistant sleeve further comprises a plurality of pockets capable of retaining dog treats.

16. The method of claim 11, wherein said water resistant sleeve further comprises a logo.

17. The method of claim 11, wherein said water resistant sleeve further comprises a plurality of sizes for smaller and larger dogs.

18. The method of claim 11, wherein said water resistant sleeve further comprises a cup-shaped article attached to the water-resistant sleeve for helping shape the bowl.

19. The method of claim 11, wherein said water resistant sleeve further comprises a construction material adapted to resist water permeation.

\* \* \* \* \*